(12) United States Patent
Kimura et al.

(10) Patent No.: US 7,684,395 B2
(45) Date of Patent: Mar. 23, 2010

(54) COMMUNICATION DEVICE AND COMMUNICATION METHOD THEREFOR

(75) Inventors: Toshihiro Kimura, Hamamatsu (JP); Shinichi Suzuki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 710 days.

(21) Appl. No.: 11/455,354

(22) Filed: Jun. 19, 2006

(65) Prior Publication Data
US 2006/0291387 A1 Dec. 28, 2006

(30) Foreign Application Priority Data
Jun. 22, 2005 (JP) ............................. P2005-182540

(51) Int. Cl.
*H04L 12/28* (2006.01)
(52) U.S. Cl. ...................... 370/389; 370/401; 709/238; 713/153
(58) Field of Classification Search ........................ None
See application file for complete search history.

(56) References Cited

U.S. PATENT DOCUMENTS

| | | | | |
|---|---|---|---|---|
| 5,805,827 | A * | 9/1998 | Chau et al. | 709/247 |
| 6,085,238 | A * | 7/2000 | Yuasa et al. | 709/223 |
| 7,277,948 | B2 * | 10/2007 | Igarashi et al. | 709/227 |
| 2001/0053694 | A1 * | 12/2001 | Igarashi et al. | 455/433 |
| 2006/0256770 | A1 * | 11/2006 | Caci | 370/352 |
| 2007/0064731 | A1 * | 3/2007 | Mizutani et al. | 370/468 |

FOREIGN PATENT DOCUMENTS

JP 2004-104542 4/2004

OTHER PUBLICATIONS

Sullenberger, Mike, "Dynamic Multipoint IPsec VPNs (Using Multipoint GRE/NHRP to Scale IPsec VPNs)," http://www.cisco.com/warp/public/3/jp/service/tac/105/dmvpn-j.shtml, Cisco Systems.
"NEC Develops Networking that Enable Easy Building of Safe Collaborative Environments Unrestricted by Department and Frameworks," http://www.nec.co.jp/press/ja/0411/2904.html, NEC Corporation.

* cited by examiner

*Primary Examiner*—Bob A Phunkulh
(74) *Attorney, Agent, or Firm*—Pillsbury Winthrop Shaw Pittman LLP (57) ABSTRACT

Encrypted communications are performed between private networks over a wide-area network (e.g., the Internet) by way of routers, each of which includes a management table for storing entries including identifiers and control parameters. Uplink control connections are established between routers so as to mutually communicate and update stored contents of management tables therebetween. Updated stored contents of management tables are subjected to publication to other routers. Alternatively, stored contents of management tables are periodically subjected to publication to other routers. Thus, it is possible for operations managers to reduce manual operations for setting up control parameters in management tables of routers.

9 Claims, 5 Drawing Sheets

| PHYSICAL IDENTIFIER | LOGICAL IDENTIFIER | REGISTRATION TIME | PUBLICATION SOURCE IDENTIFIER | PASSWORD | CONTROL PARAMETER | KEY FACTOR | MAXIMUM GROUND NUMBER | PNW IDENTIFIER |
|---|---|---|---|---|---|---|---|---|

FIG. 4

| DESTINATION IDENTIFIER | EFFECTIVE PARAMETER | ADVANCE SHARED KEY | PNW IDENTIFIER |
|---|---|---|---|

COMMUNICATION DEVICE AND COMMUNICATION METHOD THEREFOR

BACKGROUND OF THE INVENTION

1. Field of the Invention

This invention relates to communication devices and communication methods for improving communications between private networks, which are connected to wide-area networks, in terms of security.

This application claims priority on Japanese Patent Application No. 2005-182540, the content of which is incorporated herein by reference.

2. Description of the Related Art

Conventionally, "Ethernet" (registered trademark) is known as a type of local area network set up at companies so as to mutually interconnect communication networks (hereinafter, referred to as private networks), each of which interconnects prescribed communication terminals, via private lines, thus allowing communications to be performed between private networks. In general, private lines are secure from wiretapping and manipulation in communications. Hence, it is possible to establish security in communications between private networks via private lines.

However, there is a considerable cost in the establishment of private lines. For this reason, it is demanded that private networks be connected to wide-area networks (such as the Internet) to connect many communication terminals in public so as to establish security in communications between private networks via wide-area networks. In order to satisfy such demand, conventional technology known as "IPsec" (i.e., Internet Protocol Security Protocol) is used.

IPsec is a technology in which communications are performed by way of routers in connection with private networks via wide-area networks and are subjected to encryption in accordance with communication protocols known as ESP (Encapsulating Security Payload) and IKE (Internet Key Exchange), thus avoiding wiretapping and manipulation of data transmitted between routers. Specifically, EPS provides communication protocols for encrypting certifications and communications between routers in accordance with prescribed algorithms, and IKE provides communication protocols for producing key information for encryption.

As described above, communications based on IPsec are performed by way of routers in connection with private networks connected to wide-area networks, thus establishing security in communications between routers. In order to realize communications based on IPsec, it is necessary to set various control parameters regarding IPsec for the routers. Generally, it is necessary for engineers or operations managers (or datacenter managers) to manually set up control parameters for routers.

Numerous control parameters are required for the setup of routers. In addition, it is necessary to set up the same control parameters for all routers performing communications based on IPsec because routers which do not have the same control parameters cannot perform communications based on IPsec. Hence, it is very troublesome for operations managers to perform setup operations on routers. When operations managers make errors in setting up control parameters, it is very difficult for them to identify the incorrectly set parameters among the numerous control parameters.

Various technologies have been developed to make the setup of control parameters easier and to avoid setup errors. Examples are disclosed in Japanese Unexamined Patent Application Publication No. 2004-104542 and in the websites at the URLs http://www.cisco.com/japanese/warp/public/3/jp/service/tac/105/ dmvpn-j.shtml and http://www.nec.co.jp/press/ja/0411/2904.html.

The aforementioned technologies teach that control parameters are stored in advance on servers, which are accessible by routers for establishing connections between private networks and wide-area networks, and the control parameters stored on the servers are downloaded to and stored on the routers so that the same control parameters can be properly set up for the routers.

In the aforementioned technologies, when numerous routers simultaneously make download requests of servers in a short period of time in order to download control parameters, the servers may bear very high processing loads, due to which the time required for completing downloading of control parameters is increased. When malfunctions occur in the servers so that the servers cannot accept download requests, it becomes impossible for the routers to perform communications based on IPsec.

SUMMARY OF THE INVENTION

It is an object of the present invention to provide a communication device and a communication method therefor, in which encrypted communications are performed by setting up control parameters via wide-area networks without causing concentration of processing load in a specific device.

The present invention is directed to a communication system that performs encrypted communications over a wide-area network by way of a plurality of communication devices (e.g., routers or routers), each of which includes a management table, a setup processing, a communication, an update processing, and a publication processing.

The management table stores a plurality of entries including identifiers and control parameters used for performing encrypted communications between first and second communication devices in accordance with a first communication protocol. The setup processing writes the entries regarding the first and second communication devices into the management table. The communication control establishes a first connection allowing the entries stored in the management table to be transmitted from the first communication device to the second communication device in accordance with a second communication protocol that differs from the first communication protocol. Upon request, the communication control establishes a second connection realizing reception of data transmitted thereto from a third communication device in accordance with the second communication protocol. The update processing receives at least one entry transmitted thereto via the second connection so as to update the entries stored in the management table except the entry regarding the first communication device. The publication processing periodically transmits the entries stored in the management tables via the first connection. Alternatively, the publication processing transmits the entries stored in the management tables when they are updated.

As described above, with respect to the first communication device, the entries stored in the management table other than the entry of the first communication device are updated in response to the entry transmitted thereto via the second connection. In addition, the entries stored in the management table of the first communication device are periodically transmitted to the second communication device via the first connection. Alternatively, the updated entries are transmitted from the first communication device to the second communication device every time they are updated in response to the entry of the third communication device transmitted thereto via the second connection. This realizes publication of the same entries between plural communication devices over the wide-area network.

In addition, the communication control makes a decision as to whether or not the first connection is valid based on a response to a prescribed message, which is transmitted from the first communication device to the second communication device via the first connection, wherein when the first connection is not valid, the communication control breaks the first connection and then reestablishes a new connection based on the entries stored in the management table. It is possible for each communication device to further include a timer, and for the update processing to read a write time from the timer when the entry received via the second connection is written into the management table, so that the entry can be written into the management table in association with time data representing the write time. The entry can be deleted from the management table when a prescribed time passes from the write time represented by the time data. This realizes automatic updating of the management table in which an old entry is deleted after lapse of the prescribed time counted from the write time.

Furthermore, when the update processing writes a new entry into the management table, the first connection is established with respect to a new communication device designated by an identifier included in the new entry.

As a result, it is possible to avoid concentration of loads at a specific communication device, and it is possible to reduce manual operation for setting up control parameters for communication devices performing encrypted communications therebetween.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

[A] Communication System

Figure 1:
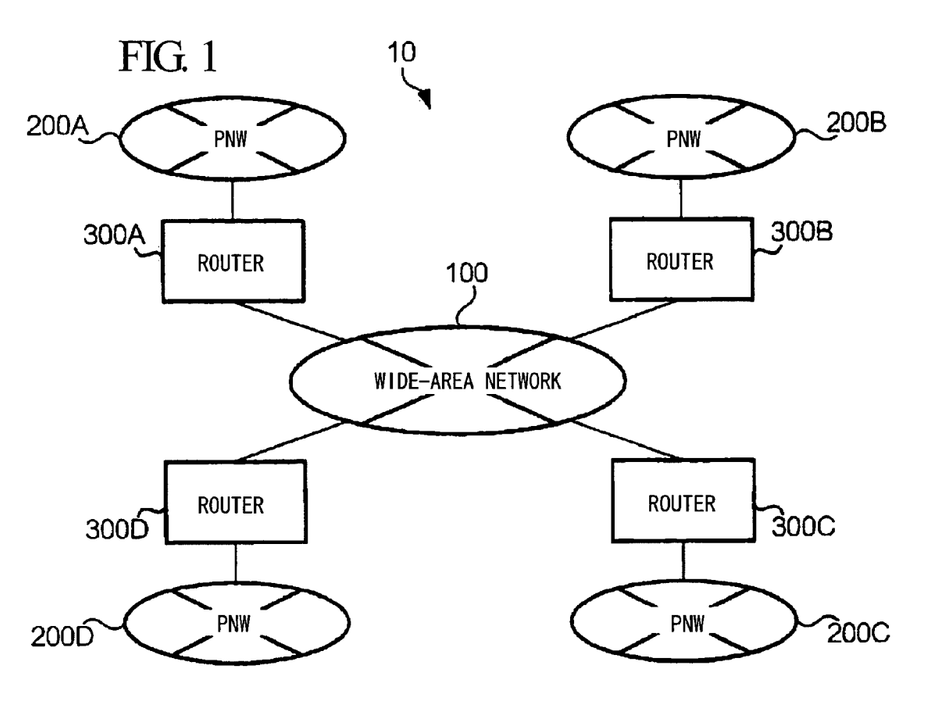
FIG. 1 is a system diagram showing the overall constitution of a communication system including private networks and routers connected to a wide-area network.

FIG. 1 shows a communication system 10 including plural routers, each of which represents a communication device in accordance with a preferred embodiment of the present invention. The communication network 10 of FIG. 1 includes a wide-area network 100 (e.g., the Internet), private networks (each denoted PNW) 200A, 200B, 200C, and 200D, and routers 300A, 300B, 300C, and 300D. The routers 300 (representing reference numerals 300A, 300B, 300C, and 300D) serve as routers for establishing interconnections between the private networks 200 (representing reference numerals 200A, 200B, 200C, and 200D) and the wide-area network 100. The present embodiment uses the Internet as the wide-area network 100; however, it is possible to use other types of wide-area networks or other types of communication networks for establishing connections between communication terminals used by the general public. The communication system 10 is designed such that the four private networks 200 are respectively connected to the wide-area network 100 via the four independent routers 300. Of course, the number of the private networks 200 connected to the wide-are network 100 is not necessarily limited to four. In short, the communication system 10 can be designed such that two or more private networks are connected to a single wide-area network via specific routers.

Suppose that a certain company has four branches A, B, C, and D, in which the four private networks 200A, 200B, 200C, and 200D are respectively set up based on Ethernet technology, wherein each branch has an intranet establishing connection between communication terminals (e.g., personal computers). For the sake of convenience, the four private networks 200A to 200D are collectively denoted private networks 200. The private networks 200 are not necessarily designed based on Ethernet, which can be replaced with a token ring. In short, it is possible for the present embodiment to use any type of communication network having accessibility to the wide-area network 100 via routers.

The routers 300A to 300D are used to perform communications between the private networks 200A to 200D and the wide-area network 100 in accordance with prescribed communication protocols such as TCP (i.e., transmission control protocol). For the sake of convenience, the four routers 300A to 300D are collectively denoted routers 300. The present embodiment is not necessarily limited to use the routers 300, which can be replaced with gateways that can perform communications between the private networks 200 and the wide-area network 100 while performing mutual conversion between communication protocols of the private networks 200 and communication protocols of the wide-area network 100.

Each of the routers 300 used in the communication system 10 shown in FIG. 1 is an example of a communication device according to the present invention and has functions of performing encrypted communications via the wide-area network 100 based on IPsec. Conventionally, in order to realize encrypted communications based on IPsec by way of routers 300, it is necessary for operations managers to manually set up various control parameters regarding IKE or ESP for the routers 300, or it is necessary for them to download control parameters via specific servers and to set them to the routers 300. In contrast, the communication system 10 of the present embodiment is designed such that the routers 300 storing control parameters set up in advance perform mutual notification (hereinafter, referred to as publication) in accordance with prescribed algorithms, thus setting up the same control parameters for all the routers 300. The constitution and operation of the routers 300 (which show the outstanding features of the present invention) will be described below.

[B] Router

Figure 2:
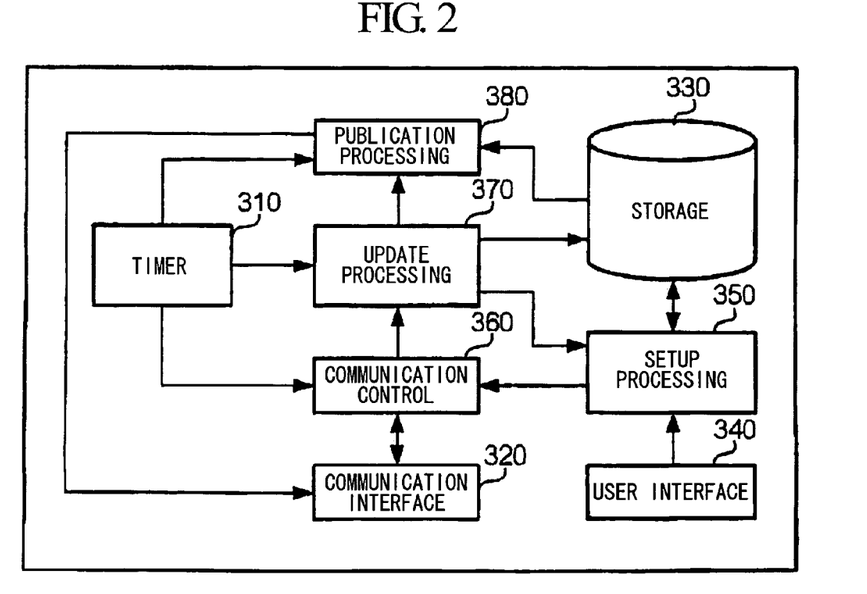
FIG. 2 is a block diagram showing the internal constitution of the router shown in FIG. 1.

FIG. 2 is a block diagram showing the internal constitution of a router 300.

The router 300 of FIG. 2 includes a timer 310, a communication interface 320, storage 330, a user interface 340, a setup processing 350, a communication control 360, an update processing 370, and a publication processing 380.

The timer 310 is a real-time clock having functions for producing time data representing the time of a request from the communication control 360 or the update processing 370, and the time data are sent to the communication control 360 or the update processing 370.

The communication interface 320 includes a first NIC (i.e., a network interface card or a network adaptor, not shown) connected to the private network 200 and a second NIC (not shown) connected to the wide-area network 100. That is, the communication interface 320 transfers received data via the NIC to the communication control 360, and it also sends transferred data from the communication control 360 to the private network 200 or the wide-area network 100 in accordance with the destination thereof.

Each NIC includes memory (not shown) for storing a MAC (media access control) address, which is a communication address for directly identifying the NIC in a data link layer. Specifically, a MAC address stored in memory of the first NIC is used as a destination address when data are transmitted from the private network 200 to the router 300 in accordance with a communication protocol adapted to the data link layer; and a MAC address stored in memory of the second NIC is used as a destination address when data are transmitted from the wide-area network 100 to the router 300 in accordance with the communication protocol of the data link layer.

The storage 330 is constituted using a hard disk for storing a management table, into which control parameters are written with respect to the various routers 300.

Figure 3:
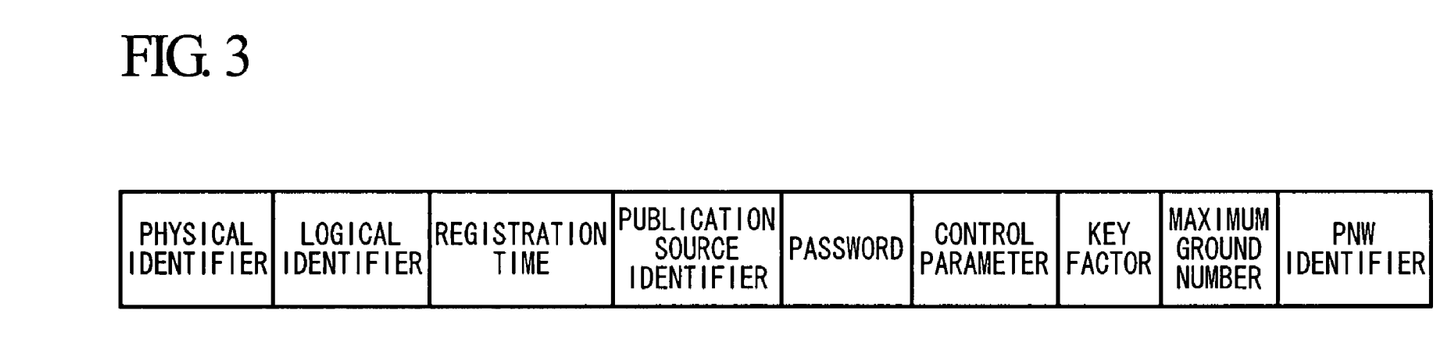
FIG. 3 shows an example of a data format of a management table stored in the storage of the router.

Specifically, the management table holds data records (hereinafter, referred to as entries), each of which has a data format shown in FIG. 3, with respect to the various routers 300. As shown in FIG. 3, each entry has eight items of data, i.e., a physical identifier, a logical identifier, a registration time, a publication source identifier, a password, a control parameter, a key factor, a maximum ground number, and a PNW identifier.

The physical identifier is used to directly identify the router 300 in response to an entry in a hardware manner (i.e., in a layer lower than the data link layer). Specifically, the physical identifier is data of a prescribed length (e.g., 32 bits), which is produced by performing calculations on the MAC address of the second NIC (used for establishing a connection between the router 300 and the wide-area network 100) in accordance with a hash algorithm (e.g., MD5 known as "message digest 5" and SHA-1 known as "secure hash algorithm-1"). The physical identifier is 32-bit data in the present embodiment, but this is not a limitation; hence, the number of bits of the physical identifier is not necessarily limited to thirty-two. However, when the length of the physical identifier is smaller than 16 bits, there is a possibility of the same physical identifier being produced for plural routers, and it cannot be used for the PNW identifier; therefore, it is preferable that the length of the physical identifier be set to 16 bits or more. As described above, the physical identifier is produced by performing calculations on the MAC address in accordance with the prescribed hash algorithm in the present embodiment, but this is not a limitation; hence, it is possible to directly use the MAC address as the physical identifier.

The logical identifier is used to directly identify the router 300 in response to an entry in a high-level protocol higher than a network layer in hierarchy. Specifically, the logical identifier is an IP address in the present embodiment, but this is not a limitation; hence, it is possible to use a domain name instead of the IP address.

The password is regarded as certification data used to request establishment of connections in communications in accordance with the prescribed communication protocol with respect to the router 300 in response to an entry.

The registration time is data representing the time at which an entry is written into the management table. In the present embodiment, when the entry is written by the update processing 370, the timer 310 sends time data in response to a request from the update processing 370, so that the time data can be used as the registration time. The registration time is used by the update processing 370 to delete an old entry, i.e., an entry in which a prescribed time has passed from the time at which it is written into the management table.

The publication source identifier is data representing a publication source of an entry. In the present embodiment, the logical identifier of a router corresponding to a transmission source of an entry is used as the publication source identifier, details of which will be described later. Specifically, the publication source identifier is used to prevent an entry from being re-transmitted to the original router after the entry stored in the management table is transmitted from the original router to another router by way of the publication processing 380. The logical identifier of a router corresponding to a publication source of an entry is used as the publication source identifier in the present embodiment, but this is not a limitation; hence, it is possible to use the physical identifier of the router as the publication source identifier.

The key factor is data for calculating an advance shared key, which is shared by routers positioned at terminals of an encryption communication path. The advance shared key is password for making the routers perform certification in accordance with the IKE. The key factor is calculated in accordance with the Diffie-Hellmann method (a cryptographic technique). Specifically, it is produced in accordance with the following equation using "X" (i.e., a natural number greater than a prescribed threshold, in other words, a pseudo random number produced by a pseudo random number producing algorithm such as a mixed congruence method), wherein the symbol "^" designates an exponential operator, and a calculation of (mod p) produces a remainder that is left after one number is divided using "p" (i.e., a prime number determined in advance by RFC 2409).

$$2\char`\^X \pmod{p}$$

In the present embodiment, the number X and the calculation result of the equation are stored as two key factors with respect to each entry. Within the two key factors, only the calculation result of the equation is used while the number X is deleted, so that the calculation result is only subjected to publication when the stored contents of the management table are subjected to publication to other routers.

The maximum ground number represents the number of encryption communication paths that can be opened by a router with respect to an entry. For example, when the maximum ground number is set to "2", it shows that two encryption communication paths can be opened. In the following description, the maximum ground number is set to "2" by each router 300 with respect to each entry; of course, the maximum ground number is not necessarily limited to "2".

Generally speaking, the router 300 is increased in load applied thereto as the number of "opened" encryption communication paths is increased. Hence, it is preferable that the maximum ground number be appropriately set in response to the processing ability of the router 300.

The PWN identifier is an identifier that is assigned to each private network in order to directly identify a private network connected to a router with respect to an entry. In the present embodiment, the PNW identifier is produced based on the aforementioned physical identifier. Specifically, the low-order 16 bits of the physical identifier are divided into 8 high-order bits (collectively denoted "H") and 8 low-order bits (collectively denoted "L"), so that the PWN identifier is defined as "10.H.L.0/24". Suppose that the physical identifier of the router 300A is "0xa010050f" (in which the header "0x" shows that the following numbers are represented in the hexadecimal notation), for example. In this case, the PNW identifier assigned to the private network 200A is "10.5.15.0/24". The PNW identifier is used to specify a private network connected to the wide-area network 100 via an encryption communication path by way of the router 300 connected to the wide-area network 100.

The aforementioned data shown in FIG. 3 forms each entry that is stored in the management table together with the aforementioned control parameters. In addition to the management table, the storage 330 also stores passwords allowing a service provider (i.e. SP) to perform certification on the router 300 when connections are established in communications between the router 300 and the wide-area network 100. For this reason, the routers 300 are designed to establish connections in communications with the service provider, thus enabling communications therebetween via the wide-area network 100.

In FIG. 2, the user interface 340 provides a user-associated interface allowing an operations manager (who manages the router 300) to perform initialization on the management table.

Specifically, the user interface 340 is connected to a display such as a serial console (not shown) and a manual input tool such as a keyboard (not shown), for example. The user interface 340 controls the display to make it show a screen image allowing the operations manager to perform initialization; hence, the operations manager who sees the screen image can operate the manual input tool to input data, which are then transferred to the setup processing 350. In the present embodiment, the operations manager of the router 300A operates the manual input tool to input the aforementioned logical identifier, key factor, maximum ground number, password, and control parameters therefor. In addition, the operations manager of the router 300A also inputs the logical identifier and password for another router (i.e., any one of the routers 300B, 300C, and 300D), which are then transferred to the setup processing 350.

The setup processing 350 has two functions, as follows.

The first function is an initialization function in which an initial entry (which is set in the management table during initialization) is produced based on data from the user interface 340; it is written into the management table; then, it is transferred to the communication control 360.

Specifically, the setup processing 350 incorporated in the presently designated router produces an initial entry therefor initially. That is, the setup processing 350 produces a physical identifier based on the MAC address of the second NIC, wherein the physical identifier is accompanied by a PNW identifier, which is produced based on the physical identifier, a logical identifier from the user interface 340, a key factor, a maximum ground number, a password, and control parameters, thus producing an initial entry with respect to the presently designated router. The setup processing 350 also produces an initial entry for another router, which includes a logical identifier and a password from the user interface 340. Details will be described later. These initial entries are used when the communication control 360 establishes connections in communications for the purpose of publication of the stored contents of the management table to the other routers.

Figure 4:
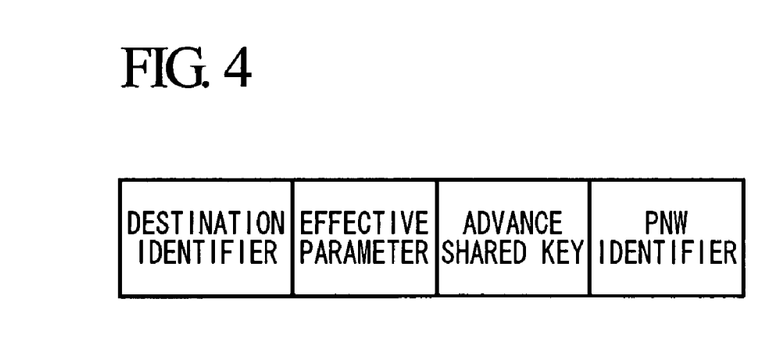
FIG. 4 shows an example of a data format of an effective entry that is produced based on the stored contents of the management table.

The second function of the setup processing 350 is an effective entry setup function in which an entry (hereinafter, referred to as an effective entry) describing control parameters (i.e., effective parameters) actually used in communications in accordance with IPsec is produced based on entries stored in the management table and is then transferred to the communication control 360 in response to a notification from the update processing 370. FIG. 4 shows an example of a data format of the aforementioned effective entry, which includes a destination identifier, effective parameters, an advance shared key, and a PNW identifier.

The destination identifier is used to directly identify a router corresponding to the destination of an encryption communication path. The effective parameters correspond to control parameters that the communication control 360 actually uses in order to perform encrypted communications with the router. The advance shared key is a password that is used when the router performs certification in accordance with IKE. The PNW identifier is used to directly identify a private network connected to the router. The effective entry of FIG. 4 is produced by the setup processing 350 and is then set for the communication control 360 as described below.

That is, when the setup processing 350 receives a notification declaring completion of updating of the management table from the update processing 370, it reads from the management table an entry of another router having a complete set of data items in entries corresponding to the routers other than the presently designated router, and then it produces an effective entry based on the read entry and the entry of the presently designated router. Specifically, a logical identifier and a PNW identifier included in the entry of the other router are respectively set for the destination identifier and the PNW identifier included in the effective entry. Effective parameters are produced as described below.

That is, the setup processing 350 compares control parameters included in the entry of the other router with control parameters included in the entry of the presently designated router with respect to each item. Herein, values of control parameters which match each other between the other router and the presently designated router are set for the corresponding items of effective parameters; and relatively small values of physical identifiers of the entries are set for the corresponding items of effective parameters. The setup processing 350 also produces the advance shared key in accordance with the Diffie-Hellman method by use of non-open data (i.e., the aforementioned number X) among key factors included in the entries for the presently designated router and the prescribed key factor (i.e., the calculation result of the aforementioned equation) included in the entry of the other router.

The communication control 360 has four functions, as follows.

The first function is a control connection establishment function for establishing connections in communications of the stored contents of the management table (i.e., entries stored in the management table) in accordance with a prescribed communication protocol (e.g., TCP) differing from IPsec on the basis of the aforementioned initial entry.

Specifically, the control connection establishment function is such that the presently designated router requests establishment of a first connection with a predetermined router (i.e., a router selected by an operations manager in advance) in order to perform publication of the stored contents of the management table, and it also proceeds to establishment of a second connection with the other router upon request in order to receive the entry therefor. Hereinafter, the first connection is referred to as an uplink control connection, and the second connection is referred to as a downlink control connection. The downlink control connection can be regarded as the uplink control connection requested by another router. The uplink control connection and downlink control connection may be regarded as connections in communications of data in accordance with TCP by way of three-way handshaking, for example.

The second function of the communication control 360 is such that, through a decision made as to whether or not the uplink control connection is valid, the validity is indicated to the publication processing 380, and an entry from the publication processing 380 is output via the uplink control connection.

The third function of the communication control 360 is such that the entry, which is received via the uplink control connection, is transferred to the update processing 370 so as to update the stored contents of the management table.

The fourth function of the communication control 360 is an encryption communication path establishment function in which encrypted communication is established in accordance with IPsec based on the aforementioned effective entry.

The update processing 370 has a specific function in which, based on the entry from the communication control 360, it updates the stored contents of the management table, and then the completion of updating is indicated to both the setup processing 350 and the publication processing 380.

Specifically, upon reception of each entry from the communication control 360, the update processing 370 makes a decision as to whether or not the received entry has to do with the presently designated router, i.e., whether or not the received entry includes the physical identifier and logical identifier of the presently designated router. If so, the update processing 370 discards the entry regarding the presently designated router. If not, the update processing 370 sets time data of the timer 310 as the registration time with respect to the received entry. In addition, the update processing 370 sets the logical identifier of a router serving as a transmission source as the publication identifier of the received entry, which is then written into the management table. When the received entry's physical identifier and logical identifier match the physical identifier and logical identifier of an entry already stored in the management table, the update processing 370 writes the received entry (from the communication control 360) over the already stored entry. Furthermore, the update processing 370 has an auto-deletion function in which the entry, in which the time data is set as the registration time and which has been written into the management table, is automatically deleted from the management table when a prescribed time lapses from the registration time.

The publication processing 380 has a publication function in which, upon reception of notification from the communication control 360 that the uplink control connection is established and is valid, or upon reception of notification from the update processing 370 that the stored contents of the management table have been updated, the stored contents of the management table are subjected to publication via the uplink control connection.

Specifically, upon reception of notification from the communication control 360 or upon reception of notification from the update processing 370, the publication processing 380 sequentially reads entries from the management table so as to select an entry whose publication identifier differs from the logical identifier of the router corresponding to a destination of the uplink control connection, and the selected entry is transferred to the communication control 360 and is then subjected to transmission via the uplink control connection. The reason why entries whose publication identifiers match the logical identifier of the router corresponding to the destination of the uplink control connection are not subjected to transmission is that these entries are originally transmitted from the router corresponding to the destination of the uplink control connection and are therefore useless if transmitted. When the publication processing 380 transfers the entry regarding the presently designated router to the communication control 360, it deletes un-open data from key factors included in the entry.

[C] Operation

Next, operation of the router 300 representing technical features of the communication device of the present embodiment will be described with reference to the accompanying drawings. The following description is given under the precondition that the management table of the router 300 stores an initial entry regarding the presently designated router as well as another initial entry including the logical identifier and password of the other router in advance.

Specifically, the management table of the router 300A stores initial entries of the routers 300A and 300D; the management table of the router 300B stores initial entries of the routers 300B and 300A; the management table of the router 300C stores initial entries of the routers 300C and 300B; and the management table of the router 300D stores initial entries of the routers 300D and 300C. In each router 300, the setup processing 350 sets the aforementioned initial entries in the communication control 360 in advance.

(1) Publication Processing

A description will be given with respect to the publication processing (i.e., entry publication operation) in which the stored contents of the management table of the presently designated router are subjected to publication to the other router.

Figure 5:
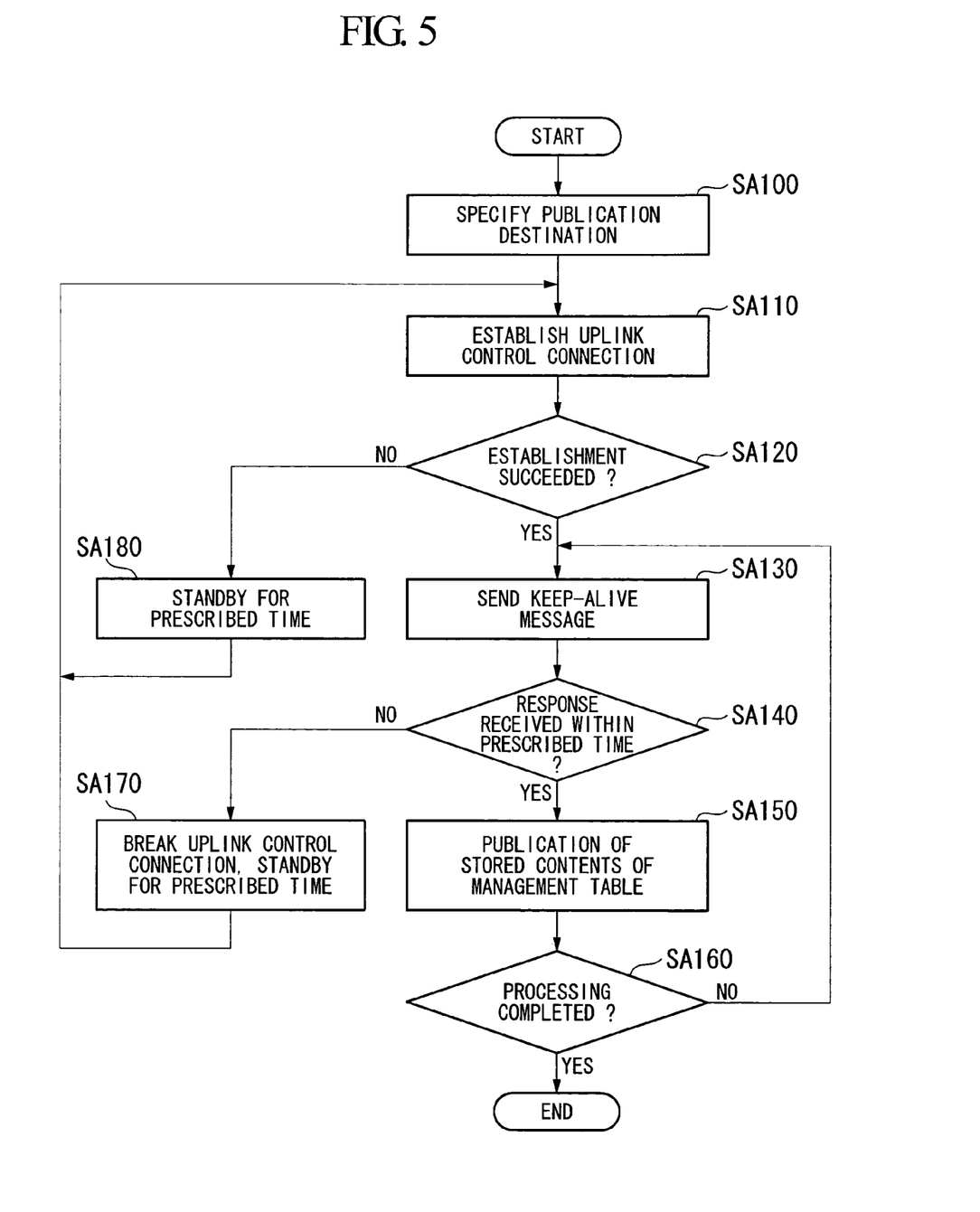
FIG. 5 is a flowchart showing publication processing in which the stored contents of a management table of one router are subjected to publication to another router.

FIG. 5 is a flowchart showing the publication processing in accordance with the present embodiment.

In step SA100, the communication control 360 specifies a publication destination, to which the stored contents of the management table of the presently designated router are transferred, on the basis of the aforementioned initial entries. Specifically, the communication control 360 selects an initial entry whose logical identifier differs from the logical identifier of the presently designated router from among the initial entries set by the setup processing 350, thus specifying a router designated by the selected initial entry as the publication destination.

In the present embodiment, the initial entries of the routers 300A and 300D are set to the communication control 360 of the router 300A, which thus specifies the router 300D as the publication destination. Similarly, the communication control 360 of the router 300B specifies the router 300A as the publication destination; the communication control 360 of the router 300C specifies the router 300B as the publication destination; and the communication control 360 of the router 300D specifies the router 300C as the publication destination.

When the publication destination is specified as described above, the flow proceeds to step SA110 in which the communication control 360 proceeds to establishment of an uplink control connection to the publication destination.

Specifically, the communication control 360 produces a message requesting establishment of connection (hereinafter, referred to as an SYN message), in which the logical identifier included in the initial entry designating the publication destination is written as a destination address, and the password included in the initial entry is written into a message area and is then subjected to transmission. Since the router 300D is specified as the publication destination of the router 300A, the router 300A sends the SYN message to the router 300D.

Figure 6A:
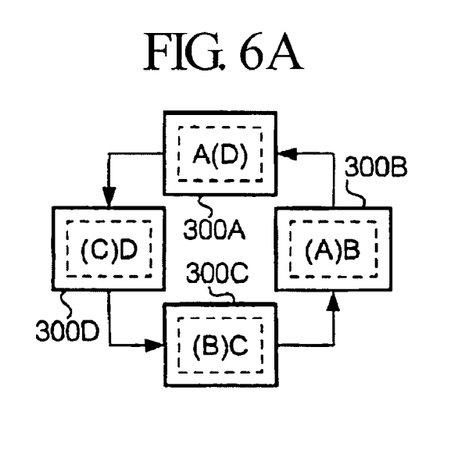
FIG. 6A shows an example of uplink control connections established between four routers 300A-300D.

The communication control 360 of the router 300D receives the SYN message via the wide-area network 100. Then, the router 300D sends back a SYN/ACK message to the transmission source (i.e., the router 300A); thus, it is possible to establish an uplink control connection reaching from the router 300A to the router 300D. Similarly, the router 300B sends a SYN message to the router 300A; the router 300C sends a SYN message to the router 300B; and the router 300D sends a SYN message to the router 300C. Thus, it is possible to establish uplink control connections between the routers 300A-300D as shown in FIG. 6A. Herein, an arrow pointing from the router 300A to the router 300D shows an uplink control connection that is established when the router 300A sends a SYN message to the router 300D. Blocks defined using dotted lines designate management tables, each of which includes two capital letters, one of which designates an entry of the corresponding router, and the other of which (in parentheses) designates an entry including only the logical identifier and password within initial entries that are set by the operations manager with respect to each router.

In FIG. 5, after completion of step SA110, the flow proceeds to step SA120 in which, on the basis of a decision as to whether or not the publication destination has sent back a prescribed response message (i.e., a SYN/ACK message), the communication control 360 makes a decision as to whether or not an uplink control connection has been successfully established. Specifically, upon reception of the prescribed response message from the communication interface 320, the communication control 360 determines that the uplink control connection has been successfully established. The present embodiment is designed such that the communication control 360 proceeds to establishment of the uplink control connection in accordance with three-way handshaking; however, the present invention is not necessarily limited to the present embodiment; hence, it is possible to redesign the present embodiment such that the communication control 360 proceeds to establishment of the uplink control connection in accordance with another algorithm.

When the decision in step SA210 is "NO", in other words, when the communication control 360 fails to establish the uplink control connection, it is placed in a standby state for a prescribed time by executing a "sleep command" in step SA180; then, the flow proceeds back to step SA110, so that the aforementioned steps are repeated again.

When the decision in step SA120 is "YES", in other words, when the communication control 360 establishes the uplink control connection, the communication control 360 sends a prescribed message (i.e., a keep-alive message) via the uplink control connection (which is established in step SA10) in step SA130. In addition, the timer 310 starts counting time. In step SA140, the communication control 360 makes a decision as to whether or not it has received a response message (e.g., ACK) responding to the keep-alive message before a timeout length of time lapses from the timing of sending the keep-alive message. Since the present embodiment is designed such that the publication destination sends back a SYN/ACK message, the decision in step SA120 turns to "YES", so that the foregoing step SA130 is executed. The following description is made with respect to the situation in which the publication destination sends back an ACK message responding to the keep-alive message, which the communication control 360 sends in step SA130.

When the decision in step SA140 is "NO", the flow proceeds to step SA170 in which the communication control 360 breaks the uplink control connection and is then placed in a standby state for a prescribed time. Then, the communication control 360 repeats the foregoing steps following the foregoing step SA110. When the decision in step SA140 is "YES", the communication control 360 sends notification of this fact to the publication processing 380. Since the present embodiment is designed such that the publication destination sends back a response message responding to the keep-alive message, the decision in step SA140 turns to "YES", so that the communication control 360 sends the aforementioned notification to the publication processing 380.

Upon reception of the aforementioned notification, the publication processing 380 executes publication processing in which the stored contents of the management table are subjected to publication via the uplink control connection in step SA150.

Specifically, the publication processing 380 reads all the entries stored in the management table, and it compares publication source identifiers included in the entries with the logical identifier of the router corresponding to the publication destination. The entries whose publication source identifiers do not match the logical identifier of the router corresponding to the publication destination are selectively transferred to the communication control 360 and are then subjected to transmission via the uplink control connection.

Since the management table of the router 300A stores two initial entries regarding the routers 300A and 300D in advance, and no publication source identifier is set for these initial entries, the publication processing 380 of the router 300A transfers them to the communication control 360. As a result, the two initial entries are transmitted from the router 300A to the router 300D via the uplink control connection.

Thereafter, the flow proceeds to step SA160 in which the router 300 makes a decision as to whether or not completion of the publication processing has been designated via the user interface 340. When the decision in step SA160 is "NO", the flow proceeds back to step SA130 so that its following steps are repeated.

(2) Update Processing

Figure 7:
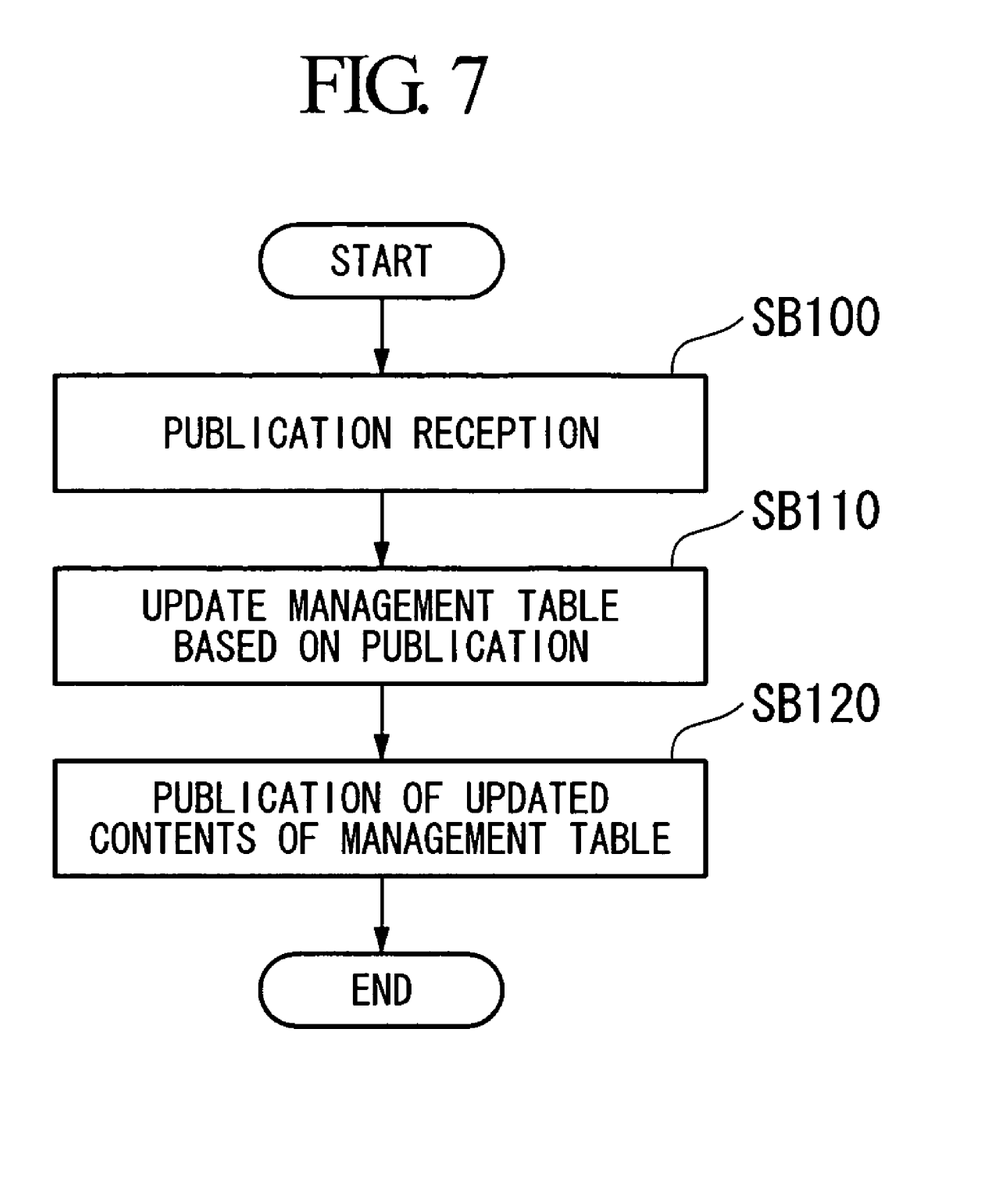
FIG. 7 is a flowchart showing the update processing performed by a router.

Next, a description will be given with respect to the updating processing which the presently designated router performs upon reception of an entry transmitted thereto from another router. The following description is made with respect to the updating processing which the router 300D performs upon reception of two entries (i.e., an entry regarding the router 300A and an entry regarding the router 300D) from the router 300A.

FIG. 7 is a flowchart showing the update processing performed by the router. In step SB100, the communication control 360 of the router 300D receives entries from another router (i.e., the router 300A) via the communication interface 320, it transfers them to the update processing 370.

In step SB110, the update processing 370 updates the stored contents of the management table in accordance with the following procedures based on the entries transferred thereto from the communication control 360. First, the update processing 370 discards any entries regarding the presently designated router (i.e., entries including the logical identifier or the physical identifier of the presently designated router) among the entries that are received in step SB100. Then, the update processing 370 obtains time data representing the present time from the timer 310, and the update processing 370 replaces the registration times of the remaining entries with the time data, and writes the logical identifiers of routers corresponding to transmission sources of the remaining entries into the publication source identifier, and then it writes the remaining entries into the management table.

Since the router 300D receives the entries regarding the routers 300A and 300D from the router 300A, only the entries regarding the router 300A are additionally written into the management table of the router 300D. As a result, the stored contents of the management table of the router 300D become those shown in FIG. 6B.

In FIG. 7, upon completion of updating of the stored contents of the management table of the router 300D, the update processing 370 sends a notification to the publication processing 380 and the setup processing 350, so that the publication processing 380 execute publication regarding the updated stored contents of the management table in step SB120; the setup processing 350 produces an effective entry based on the updated stored contents of the management table; and then the effective entry is set in the communication control 360. That is, when the stored contents of the management table are updated, the updated stored contents of the management table are automatically subjected to publication irrespective of the periodic publication that is performed upon determination regarding the validity of uplink control connections in light of a keep-alive message. Incidentally, the publication processing of step SB120 is similar to the publication processing of step SA160 in that an entry whose publication source identifier matches the publication source identifier regarding the destination (i.e., publication destination) of the uplink control connection is not subjected to publication.

Figure 6B:
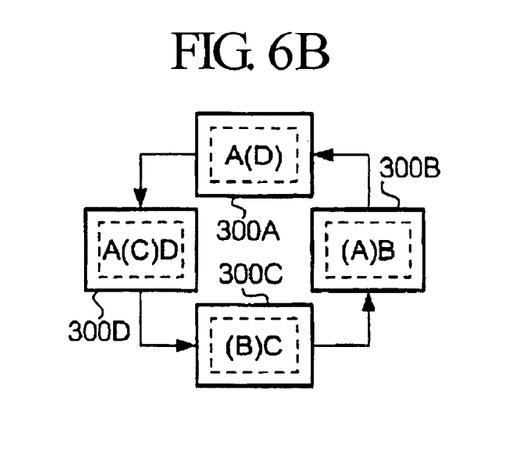
FIG. 6B shows an example of uplink control connections stored in a management table of the router 300D.
Figure 6C:
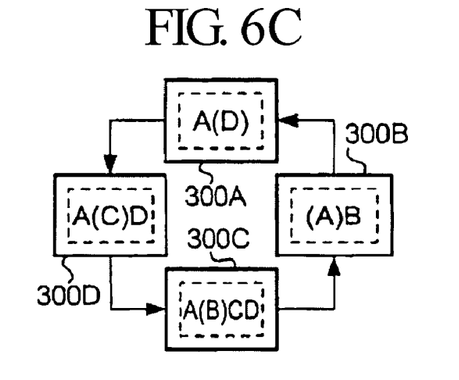
FIG. 6C shows an example of uplink control connections stored in a management table of the router 300C.

Since the stored contents of the management table of the router 300D are updated as shown in FIG. 6B, the publication processing 380 reads three entries regarding the routers 300A, 300B, and 300D, so that the three entries are transmitted to the router 300C. Thus, the router 300C updates the stored contents of the management table, which thus become those shown in FIG. 6C.

Figure 6D:
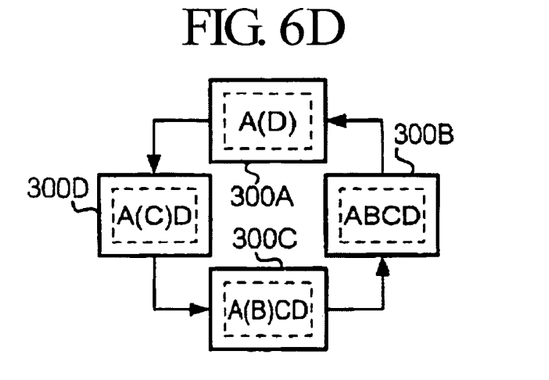
FIG. 6D shows an example of uplink control connections stored in a management table of the router 300B.

When the router 300C updates the stored contents of the management table thereof, the updated stored contents are subjected to publication to the router 300B. As a result, four entries regarding the routers 300A, 300B, 300C, and 300D are transmitted from the router 300C to the router 300B. Due to such publication, the router 300B updates the stored contents of the management table, which thus become those shown in FIG. 6D.

Figure 6E:
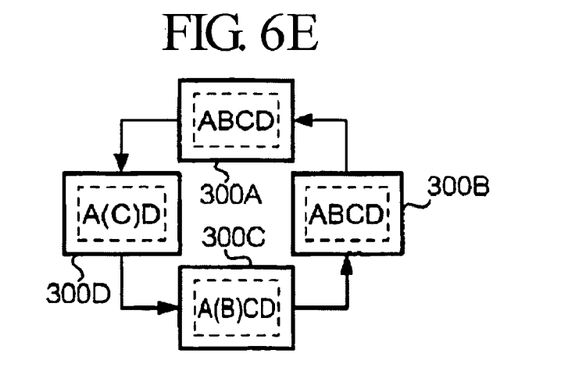
FIG. 6E shows an example of uplink control connections stored in a management table of the router 300A.

Thereafter, the router 300B updates the stored contents of the management table, which are then subjected to publication to the router 300A. Hence, the stored contents of the router 300A become those shown in FIG. 6E.

Thereafter, the stored contents of the management table of the router 300A are subjected to publication from the router 300A to the router 300D; and then the stored contents of the router 300D are subjected to publication from the router 300D to the router 300C. As a result, the same entries are stored in the management tables of all the routers 300A, 300B, 300C, and 300D.

As described above, all the routers 300 eventually have the same stored contents in the management tables thereof. This does not raise contradictions between effective entries produced based on entries. Specifically, effective parameters stored in the effective entry of the router 300D produced in the router 300A are identical to effective parameters stored in the effective entry of the router 300A produced in the router 300D.

The present embodiment is advantageous in that the operations manager of each router 300 is simply requested to set up control parameters and a publication destination therefor. This considerably reduces the number of control parameters to be set up as compared with the conventional technology. Hence, it is possible to reduce the load on the operations manager.

Moreover, the present embodiment does not need a server for downloading control parameters to the router 300. Hence, it is possible to avoid trouble due to the provision of a server.

[D] Variations

The present invention is not necessarily limited to the present embodiment, but can be appropriately modified or varied as described blow.

(1) The present embodiment is designed such that, when effective parameters are produced based on control parameters of the presently designated router and control parameters of the other router, control parameters of the router indicated by a relatively small physical identifier are given priority among control parameters which differ from each other between the presently designated router and the other router. It is possible to modify the present embodiment such that control parameters of the router indicated by a relatively large physical identifier are given priority. Alternatively, control parameters can be selected in light of the logical identifier or the maximum ground number instead of the physical identifier and then set as effective parameters. In short, it is necessary to set a prescribed rule in selecting control parameters, which are given priority within control parameters which differ from each other between plural routers; and such a prescribed rule should be set for each router 300.

(2) The present embodiment is designed such that 16-bit data, which are produced by performing prescribed calculations on MAC addresses, are used for physical identifiers adapted to layers lower than data link layers in the routers 300. Even if the length of the physical identifier is greater than sixteen bits, it may be very difficult to perfectly prevent the same physical identifier from being calculated with respect to plural routers. In connection with plural routers that do not completely match each other in terms of physical identifiers, when the same lower-order 16-bit pattern is included in plural physical identifiers, there may occur an error in which the same PNW identifier is assigned to different private networks. For this reason, it is preferable that, when plural entries whose physical identifiers include the same lower-order 16-bit pattern are stored in the management table of the router 300, the entry of the router indicated by a relatively small logical identifier be made invalid and not used for producing effective parameters. In addition, it is preferable that a new physical identifier be calculated so as to produce a new entry with respect to the presently designated router, whose entry is made invalid.

(3) The present embodiment is designed such that the operations manager sets up a single publication destination for the management table of each router. Of course, it is possible for the operations manager to set up two or more publication destinations. In addition, it is possible to establish a new uplink control connection with a router designated by an effective entry that is set by the setup processing 350.

(4) The present embodiment is designed such that each entry applied to each router includes a physical identifier for directly identifying each router in accordance with a communication protocol adapted to a lower layer, which is lower than a data link layer, and a logical identifier for directly identifying each router in accordance with a communication protocol adapted to an upper layer, which is higher than a network layer. Of course, it is possible for each entry to include only the physical identifier or the logical identifier. This is because, when the entry includes only the logical identifier, the MAC address of each router can be identified from the logical identifier in accordance with ARP (i.e., address resolution protocol), thus allowing the physical identifier to be produced based on the MAC address. In addition, when the entry includes only the physical identifier, the MAC address can be regenerated based on the physical identifier, thus allowing the IP address (i.e., logical identifier) to be assigned to the router having the MAC address in accordance with RARP (i.e., reverse ARP).

(5) The present embodiment is designed such that each entry includes the six items of registration time, publication source identifier, password, maximum ground number, key factor, and PNW identifier in addition to the physical identifier and logical identifier. With respect to an entry which is deleted by the update processing 370 when the prescribed time lapses from the time of writing into the management table, it is unnecessary for the entry to include the registration time. With respect to an entry for which certification is not performed on the source for requesting establishment of the uplink control connection, it is unnecessary for the entry to include the password. With respect to an entry which is once stored in the management table and is then subjected to transmission by the publication processing 380 without inquiring about the publication source of the entry, it is unnecessary for the entry to include the publication source identifier. With respect to an entry in which default values are set in advance with respect to all routers, it is unnecessary for the entry to include the maximum ground number and key factor. In addition, the PNW identifier can be calculated based on the physical identifier; hence, it is not necessary for the entry to include the PNW identifier. That is, the present invention simply requires that each entry stored in the management table of the communication device include either the physical identifier or the logical identifier as well as control parameters.

(6) The present embodiment is applied to the routers 300 by which the wide-area network 100 and the private network 200 are connected together. Of course, the present invention is not necessarily applied to the routers 300. That is, the present invention is applicable to servers such as database servers and application severs, which provide prescribed services via a wide-area network 100, and other types of communication devices such as communication terminals that perform communications with servers to receive services.

(7) As an example of the communication device of the present invention, the present embodiment provides the routers 300 including a timer 310, communication interface 320, storage 330, user interface 340, setup processing 350, communication control 360, update processing 370, and publication processing 380. It is possible to redesign the routers 300 in the form of a computer having a CPU serving as a controller as well as the timer 310, communication interface 320, storage 330, and user interface 340, wherein the storage 330 stores programs, which correspond to the contents of the aforementioned flowcharts shown in FIGS. 5 and 7, as well as the management table. That is, the computer acts as the communication device of the present invention by making the controller execute programs.

(8) The aforementioned programs can be written onto computer-readable storage media such as CD-ROMs, which can be distributed to the public. Alternatively, the aforementioned programs can be distributed via communication lines such as the Internet. That is, generally-used computers can read the aforementioned programs by way of computer-readable storage media or by way of communication lines so as to install them, thus realizing the aforementioned functions of the communication device of the present invention.

What is claimed is:

1. A communication system for performing communications over a wide-area network by way of a plurality of communication devices, each of which includes:
   a management table for storing a plurality of entries including identifiers and control parameters used for performing encrypted communications between first and second communication devices in accordance with a first communication protocol;
   a setup processing for writing the entry regarding the first communication device and the entry regarding the second communication device into the management table;
   a communication control for establishing a first connection allowing stored contents of the management table to be transmitted from the first communication device to the second communication device in accordance with a second communication protocol that differs from the first communication protocol, wherein upon request, said communication control establishes a second connection realizing reception of data transmitted thereto from a third communication device in accordance with the second communication protocol;
   an update processing for receiving at least one entry transmitted thereto via the second connection so as to update the stored contents of the management table except the entry regarding the first communication device; and
   a publication processing for periodically transmitting the stored contents of the management table via the first connection or for transmitting the stored contents of the management table when the stored contents of the management table are updated.

2. The communication system according to claim 1, wherein the communication control makes a decision as to whether or not the first connection is valid based on a response to a prescribed message, which is transmitted from the first communication device to the second communication device via the first connection, and wherein when the first connection is not valid, the communication control breaks the first connection and then reestablishes a new connection based on the stored contents of the management table.

3. The communication system according to claim 1, wherein each of the communication devices further includes a timer, and wherein the update processing reads a write time from the timer when the entry received via the second connection is written into the management table, and the entry is written into the management table in association with time data representing the write time, the entry is deleted from the management table when a prescribed time lapses from the write time represented by the time data.

4. The communication system according to claim 1, wherein, when the update processing writes a new entry into the management table, the first connection is established with respect to a new communication device designated by an identifier included in the new entry.

5. The communication system of claim 1, further including
an update processing for the second communication device for receiving at least one entry transmitted thereto via the first connection so as to update the stored contents of the management table except the entry regarding the second communication device;

the second communication device establishing a third connection allowing stored contents of the management table to be transmitted from the second communication device to the third communication device in accordance with a second communication protocol; and the second communication device including a publication processing for periodically transmitting the stored contents of the management table via the third connection or for transmitting the stored contents of the management table via the third connection when the stored contents of the management table are updated.

6. A computer-readable storage media for storing a program, which when executed by a computer, causes the computer to perform a method for establishing encrypted communications over a wide-area network with a plurality of computers, the method comprising the steps of:

setting up a plurality of entries including identifiers and control parameters in a management table, thus allowing the encrypted communications to be performed between a first computer and a second computer in accordance with a first communication protocol;

establishing a first connection allowing stored contents of the management table to be transmitted from the first computer to the second computer in accordance with a second communication protocol that differs from the first communication protocol;

upon request, establishing a second connection realizing reception of data transmitted thereto from a third computer in accordance with the second communication protocol;

updating the stored contents of the management table except the entry of the first computer in response to at least one entry transmitted via the second connection; and periodically transmitting the stored contents of the management table via the first connection, or transmitting the stored contents of the management table via the first connection when the stored contents of the management table are updated.

7. A communication method adapted to encrypted communications performed over a wide-area network by way of a plurality of routers, each of which includes a management table storing a plurality of entries including identifiers and control parameters, said communication method comprising the steps of:

establishing a first connection between a first router and a second router, thus performing communications therebetween with respect to the entries stored in the management tables thereof;

upon request, establishing a second connection between the first router and a third router, thus performing communications therebetween with respect to the entries stored in the management tables thereof;

updating the entries stored in the management tables other than the entry of the first router in response to the communications via the second connection; and periodically transmitting the stored contents of the management table via the first connection, or transmitting the stored contents of the management table via the first connection when the stored contents of the management table are updated.

8. The communication method according to claim 7 further comprising the step of transmitting the updated entries stored via the first connection.

9. The communication method according to claim 7 further comprising the step of periodically transmitting the entries stored in the management tables via the first connection.

* * * * *